United States Patent
Wittorf

(10) Patent No.: US 8,630,769 B2
(45) Date of Patent: Jan. 14, 2014

(54) METHOD FOR SITUATIONALLY ADJUSTING A VEHICLE AND A VEHICLE

(75) Inventor: Marten Wittorf, Ingelheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/215,531

(22) Filed: Aug. 23, 2011

(65) Prior Publication Data

US 2012/0053785 A1 Mar. 1, 2012

(30) Foreign Application Priority Data

Aug. 24, 2010 (DE) .................. 10 2010 035 199

(51) Int. Cl.
*G06F 19/00* (2011.01)

(52) U.S. Cl.
USPC ............................................. 701/36; 701/45

(58) Field of Classification Search
USPC ............. 296/37.16, 24.46, 24.4; 340/426.29; 367/93; 701/1, 45, 36
See application file for complete search history.

(56) References Cited

U.S. PATENT DOCUMENTS

| 6,349,986 B1 * | 2/2002 | Seel et al. ................ 296/37.16 |
| 6,491,332 B2 * | 12/2002 | De Ceuster ............... 296/37.16 |
| 6,669,259 B2 * | 12/2003 | Murray et al. ............ 296/24.46 |
| 6,918,734 B2 | 7/2005 | Nick et al. |
| 6,930,592 B2 * | 8/2005 | Schlecht et al. ......... 340/426.29 |
| 7,207,613 B2 * | 4/2007 | Walter et al. ................ 296/24.4 |
| 7,769,513 B2 * | 8/2010 | Breed et al. .................... 701/45 |
| 2004/0035631 A1 * | 2/2004 | Schlecht et al. ............. 180/271 |
| 2009/0046538 A1 * | 2/2009 | Breed et al. .................... 367/93 |
| 2009/0143923 A1 * | 6/2009 | Breed ............................. 701/1 |

FOREIGN PATENT DOCUMENTS

| DE | 10213307 A1 | 10/2003 |
| EP | 1366957 A2 | 12/2003 |

OTHER PUBLICATIONS

UK IPO, British Search Report for Application No. 1113296.6, dated Nov. 30, 2011.

* cited by examiner

*Primary Examiner* — Thomas Black
*Assistant Examiner* — Robert Payne
(74) *Attorney, Agent, or Firm* — Ingrassia Fisher & Lorenz, P.C.

(57) ABSTRACT

A method is provided for situationally adjusting a vehicle. The method includes, but is not limited to acquiring data of at least a partial area of an environment of the vehicle with at least one sensor with the vehicle. In addition, the approach of at least one object toward the vehicle is detected using the data acquired by the at least one sensor. Furthermore, dimensions of the at least one object are determined using the data acquired by the at least one sensor. Moreover, at least a partial area of an interior of the vehicle is adjusted to the dimensions of the at least one object.

20 Claims, 6 Drawing Sheets

METHOD FOR SITUATIONALLY ADJUSTING A VEHICLE AND A VEHICLE

CROSS-REFERENCE TO RELATED APPLICATION

This application claims priority to German Patent Application No. 102010035199.7, filed Aug. 24, 2010, which is incorporated herein by reference in its entirety.

TECHNICAL FIELD

The technical field relates to a method for situationally adjusting a vehicle, a vehicle, a computer program product and a computer-readable medium.

BACKGROUND

Known from DE 102 13 307 A1 is a loading floor for a vehicle with first guiding elements that engage second guiding elements of the vehicle to lift and remove the loading floor, wherein the first guiding elements are essentially arranged sideways on the loading floor. Also known from the latter is a loading device for a vehicle with a cargo hold, with two lateral walls to border the cargo hold, and with guiding elements to lift and remove a loading floor, wherein the guiding elements are essentially arranged on or in the lateral walls above the vehicle floor.

At least one object is to indicate a method for situationally adjusting a vehicle, a vehicle, a computer program product and a computer-readable medium, which enable an increased comfort for vehicle users, as well as a greater flexibility of use. In addition, other objects, desirable features and characteristics will become apparent from the subsequent summary and detailed description, and the appended claims, taken in conjunction with the accompanying drawings and this background.

SUMMARY

A method is provided for situationally adjusting a vehicle exhibits the following steps. At least one sensor acquires at least one partial area of an environment of the vehicle with the vehicle in an idle state. Moreover, the data acquired by the at least one sensor are used to detect the approach of at least one object toward the vehicle. Further, the data acquired by the at least one sensor are used to ascertain the dimensions of the at least one object. In addition, at least one partial area of an interior space of the vehicle is automatically adjusted to the dimensions of the at least one object.

Because the approach of an object toward the vehicle is detected with the vehicle in an idle state, the dimensions of the at least one object are determined, and at least a partial area of an interior space of the vehicle is automatically adjusted to the dimensions of the at least one object, the method for situationally adjusting the vehicle according to the invention enables an enhanced comfort for vehicle users, along with a greater flexibility of use, since the vehicle user does not have to adjust the partial area of the vehicle to the dimensions of the object.

In an embodiment, access authorization data for the vehicle are also received by means of a receiving device in the vehicle. In this embodiment, the at least one partial area of the vehicle environment is acquired by the at least one sensor after the access authorization data have been received. As a result, it can be advantageously determined whether access authorization to the vehicle exists. In addition, the time for which the sensor is activated can be decreased, leading to reduced energy consumption. The receiving device is here preferably designed to receive access authorization data from an ignition key of the vehicle.

In another embodiment, the at least one sensor is arranged in a rear area of the vehicle, and designed to acquire a rear area of the vehicle environment. The at least one sensor is preferably designed as an optical camera. This advantageously makes it possible to easily and reliably acquire the approach of objects toward the vehicle, as well as the dimensions of the acquired objects. The at least one sensor can further be designed as an electromagnetic sensor or acoustic sensor.

In another embodiment, a configuration of at least the partial area of the vehicle interior is determined before the at least partial area of the vehicle interior is automatically adjusted. Determining a configuration is understood here and below in particular as determining the arrangement of objects in the respective area and/or of user-defined settings for the respective area of the vehicle interior. The advantage to this configuration is that the at least one partial area of the interior can be automatically adjusted as precisely as possible to the dimensions of the at least one object. The at least one partial area of the vehicle interior can be automatically adjusted using at least one actuator.

The vehicle is preferably a motor vehicle. The automatic adjustment of at least one partial area of the interior can here involve automatically adjusting a configuration of the motor vehicle trunk. Additionally or alternatively, the automatic adjustment of at least a partial area of the interior can involve automatically sliding a rear shelf, for example a hat rack, and/or a trunk cover of the motor vehicle. Additionally or alternatively, the automatic adjustment of at least a partial area of the interior can further involve automatically folding over at least one seat in the motor vehicle. Beyond that, a tailgate of the motor vehicle is preferably also automatically opened.

The embodiments mentioned above permit a comfortable loading of the motor vehicle, in particular the trunk of the motor vehicle, by virtue of the fact that, already as the object, for example a package being transported by the vehicle user, approaches the vehicle, the dimensions of the latter are determined, and the interior of the motor vehicle is automatically adjusted to the determined dimensions of the object.

The application further relates to a vehicle, which exhibits at least one sensor designed to acquire at least a partial area in an environment of the vehicle. In addition, the vehicle exhibits a first determination device, which is designed to detect the approach of at least one object toward the vehicle with the vehicle idling based on data acquired by the at least one sensor. In addition, the vehicle exhibits a second determination device designed to determine the dimensions of the at least one object using the data acquired by the at least one sensor. Beyond that, the vehicle exhibits an adjustment device designed to automatically adjust at least a partial area of a vehicle interior to the ascertained dimensions of the at least one object. The vehicle exhibits the advantages already cited in conjunction with the method according to the application, which will not be enumerated again at this juncture to avoid repetition, wherein preference is here given to a motor vehicle, in particular a passenger car.

A computer program product is also provided which, when integrated into the central processing unit of a vehicle, directs the central processing unit to perform the following steps. The central processing unit is directed to acquire at least a partial area of the environment of a vehicle by means of at least one sensor with the vehicle idling. Furthermore, the central processing unit is directed to detect the approach of at least one object toward the vehicle using data acquired by the at least one sensor. In addition, the central processing unit is directed to determine the dimensions of the at least one object using the data acquired by the at least one sensor. Moreover, the central processing unit is directed to automatically adjust at least a partial area of a vehicle interior to the determined dimensions of the at least one object.

A computer-readable medium is also provided, which stores a computer program product according to the embodiment mentioned. The computer program product and the computer-readable medium according to the application already exhibit the advantages mentioned in conjunction with the method according to the application, which will not be enumerated at this juncture in order to avoid repetition.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
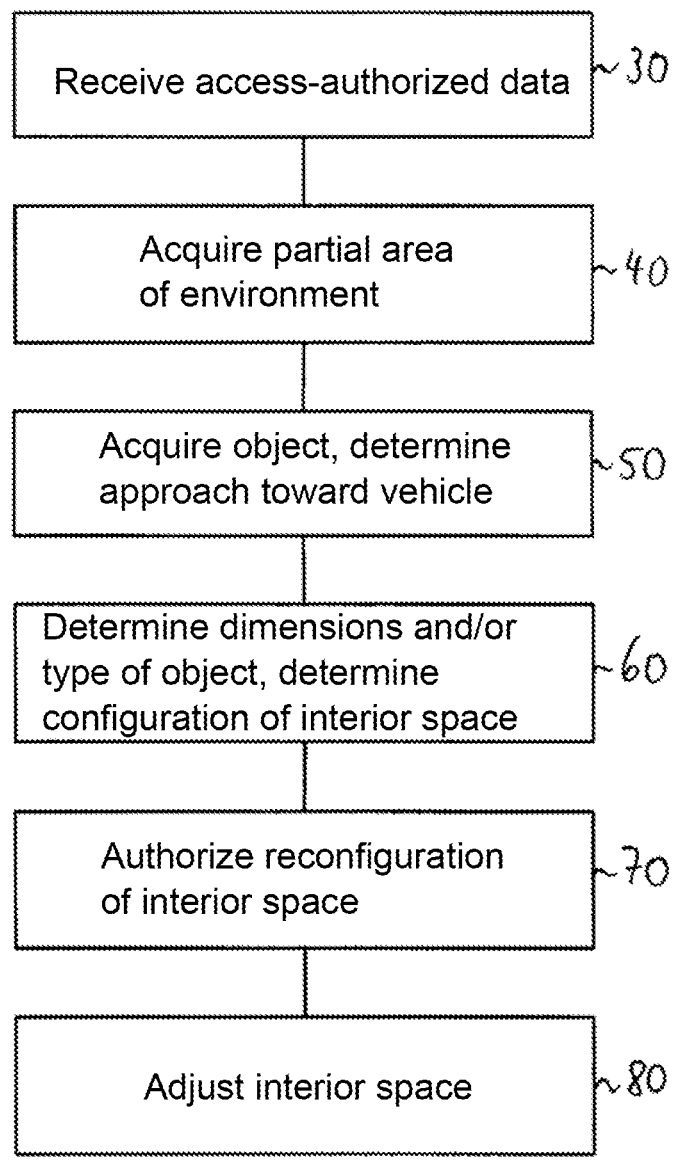
FIG. 1 shows a flowchart of a method for situationally adjusting a vehicle according to an embodiment.

FIG. 1 shows a flowchart of a method for situationally adjusting a vehicle according to an embodiment. In step 30, access authorization data for the vehicle are received by means of a vehicle receiving device. For example, the receiving device is here designed for receiving access authorization data from an ignition key of the vehicle.

After the access authorization data have been received, step 40 of the embodiment shown involves using at least one sensor to acquire at least a partial area of the vehicle environment. The at least one sensor is here preferably arranged in a rear area of the vehicle, and designed to acquire a rear area of the vehicle environment. For example, the at least one sensor is designed as a rearward directed optical camera.

In step 50, at least one object is acquired by means of the at least one sensor, and the approach of the at least one acquired object toward the vehicle is detected by means of the at least one sensor.

In addition, step 60 involves determining the dimensions of the at least one object and/or a type of object, i.e., classifying the object, using the data acquired by the at least one sensor. The dimensions and/or type of object can here be determined using the information stored in a database. In addition, one or more desired or intended potential subsequent steps of the at least one object can be determined. Furthermore, step 60 involves determining the configuration of at least one partial area of the vehicle interior. For example, it is possible to here determine the configuration and/or allocation of seats in the vehicle, in particular a child seat, and/or user-defined, preferred settings.

Step 70 of the embodiment shown involves authorizing a certain reconfiguration of at least one partial area of the vehicle interior based on the determined configuration of the interior as well as the determined dimensions or type of the at least one object.

Further, step 80 involves automatically adjusting the at least one partial area of the vehicle interior to the determined dimensions and/or the determined type of the at least one object. To this end, an adjustment device in the embodiment shown activates at least one actuator, which is designed to adjust at least one component of the vehicle. In addition, the adjustment device can exhibit an adaptive mode, which includes a learning function in case the vehicle user at least partially overwrites the automatic adjustment, or the user introduces new settings. After automatic adjustment has taken place, the configuration of the vehicle interior can be stored and/or relayed to other vehicle components. Steps 30 to 80 can then be repeated.

Figure 2:
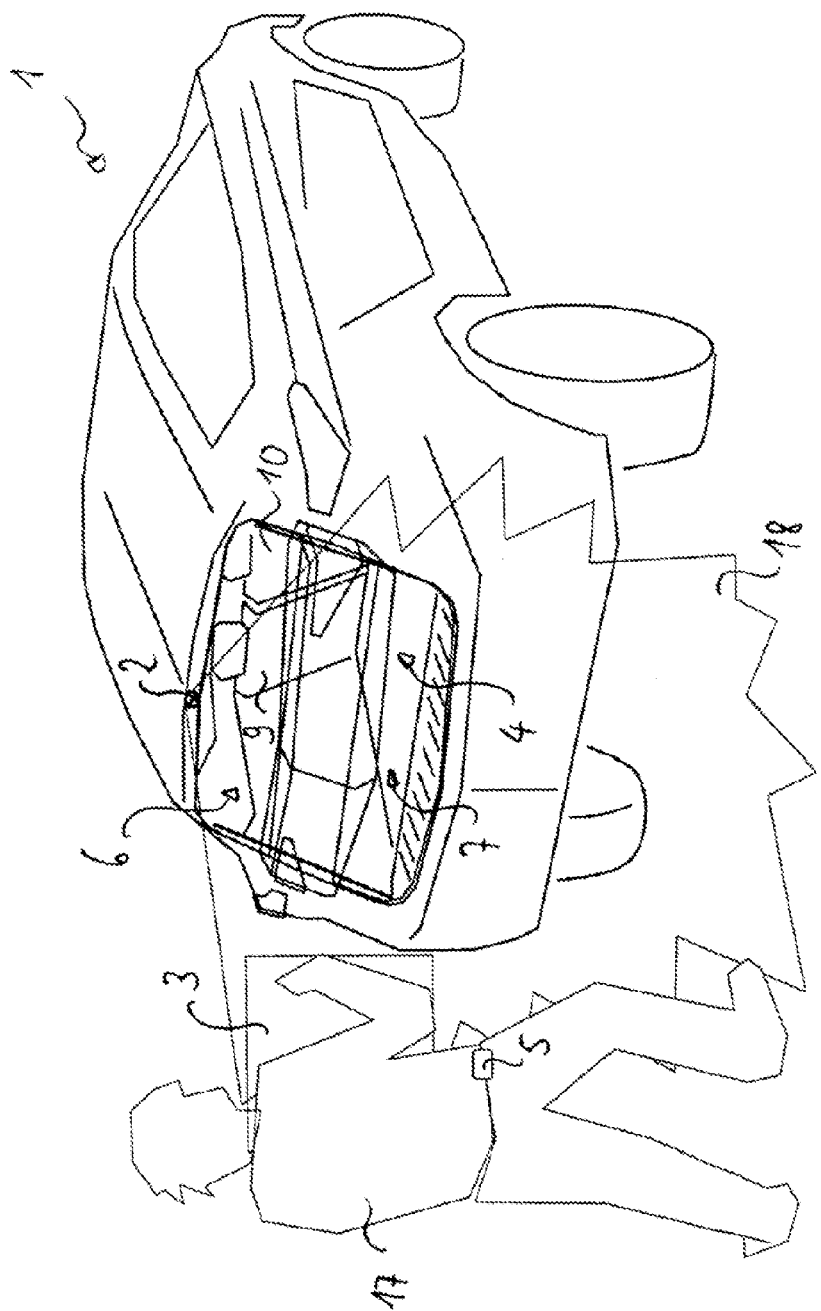
FIG. 2 shows a vehicle according to an embodiment of the application.

FIG. 2 shows a vehicle 1 according to an embodiment. In the embodiment shown, the vehicle 1 is here a motor vehicle in the form of a passenger car. The vehicle 1 exhibits a sensor 2 arranged in a rear area 6 of the vehicle 1. In the embodiment shown, the sensor 2 is arranged in the area above a trunk 7 of the vehicle 1, and designed as an optical camera. The sensor 2 exhibits an acquisition area 18 schematically depicted on FIG. 2, within which it is designed to acquire objects. The vehicle 1 also exhibits seats 9 and 10 in an interior 4 of the vehicle 1, which here comprise rear seats of the vehicle 1.

FIG. 2 further shows a person 17, for example the driver of the vehicle 1, who is nearing the vehicle 1. The access authorization data stored in the ignition key 5 of the vehicle 1 can be used to give the person 17 authorized access to the vehicle 1. After the access authorization data have been received by means of a receiving device of the vehicle 1 (not shown in any greater detail), the sensor is activated 2, and acquires a partial area of the environment of the vehicle 1 in the form of the acquisition area 18. In the embodiment shown, the person 17 carries an object 3, for example a carton, which is located at least partially within the acquisition area 18 of the sensor 2. Additional details relating to situationally adjusting the vehicle 1 will be explained in greater detail in conjunction with the following figures.

Figure 3:
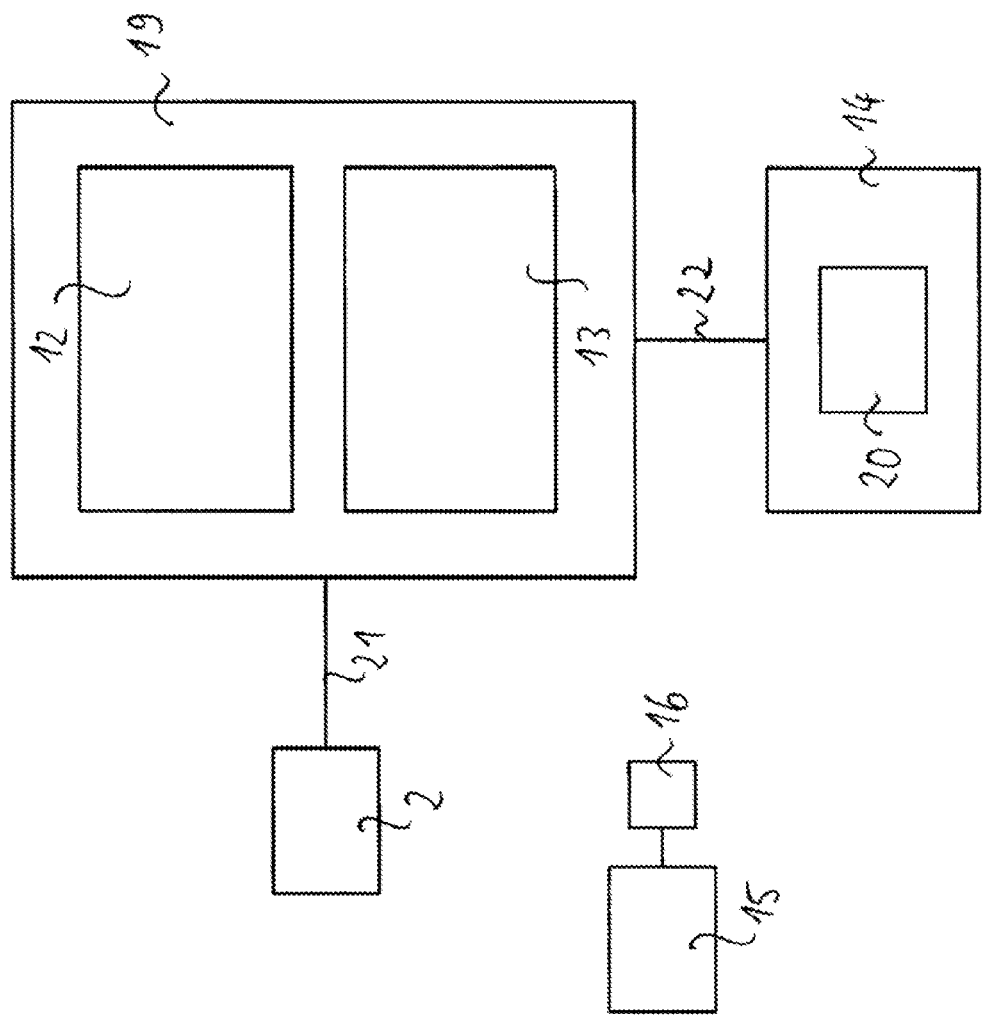
FIG. 3 shows an evaluation device of the vehicle according to FIG. 2.

FIG. 3 here shows an evaluation device 19 of the vehicle according to FIG. 2. Components having the identical functions as on FIG. 2 are labeled with the same reference numbers, and will not be explained in greater detail below. The evaluation device 19 is connected with the sensor 2 by a signal line 21, and exhibits a first determination device 12, which is used to detect the approach of at least one object toward the vehicle using data acquired by the sensor 2. Further, the evaluation device 19 exhibits a second determination device 13 designed to ascertain the dimensions of the at least one object using the data acquired by the sensor 2.

A connecting line 22 links the evaluation device 19 with an adjustment device 14, which is designed for automatically adjusting at least a partial area of the vehicle interior to the dimensions of the at least one object. To this end, the adjustment device 14 in the embodiment shown exhibits at least one actuator 20. In addition, the vehicle not shown on FIG. 3 exhibits a central processing unit 15 and computer-readable medium 16, wherein the computer-readable medium 16 stores a computer program product which, when integrated into the central processing unit 15, directs the central processing unit 15 to perform the steps cited in conjunction with the embodiments of the method, in particular the steps of the method according to FIG. 1, by means of the elements here mentioned. To this end, the central processing unit 15 is directly or indirectly connected with the corresponding elements in a way not shown in any greater detail.

Figure 4A:
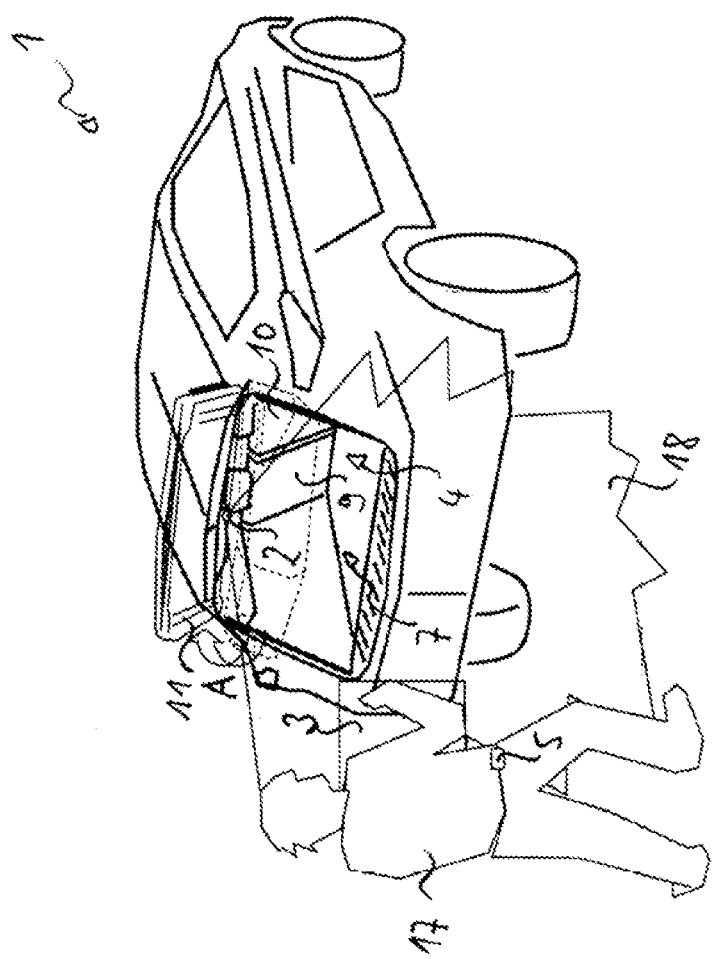
FIGS. 4A to 4C show the sequence of a method for situationally adjusting the vehicle according to FIG. 2.
Figure 4B:
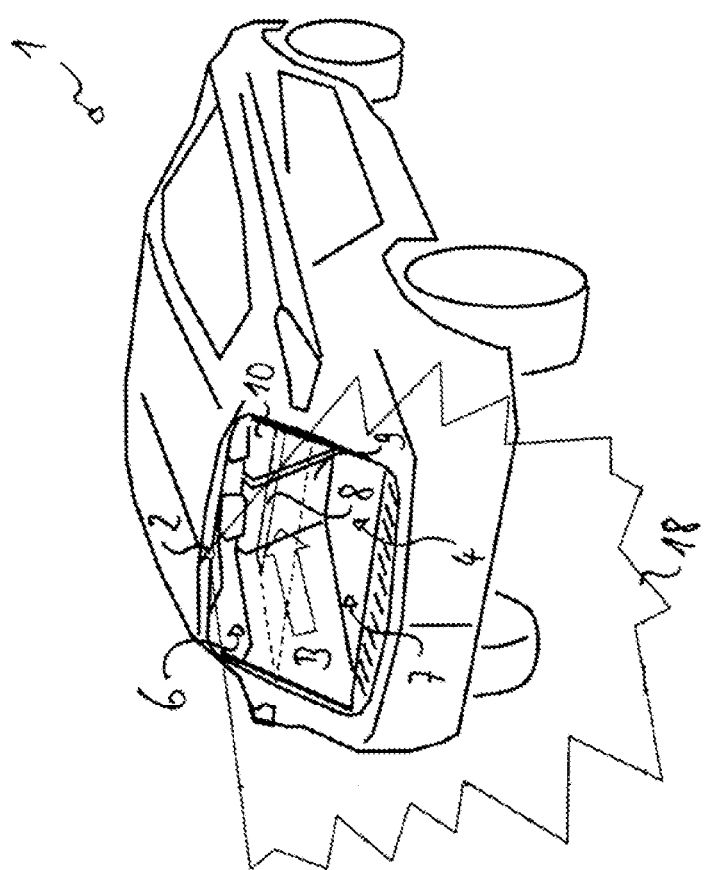
Figure 4C:
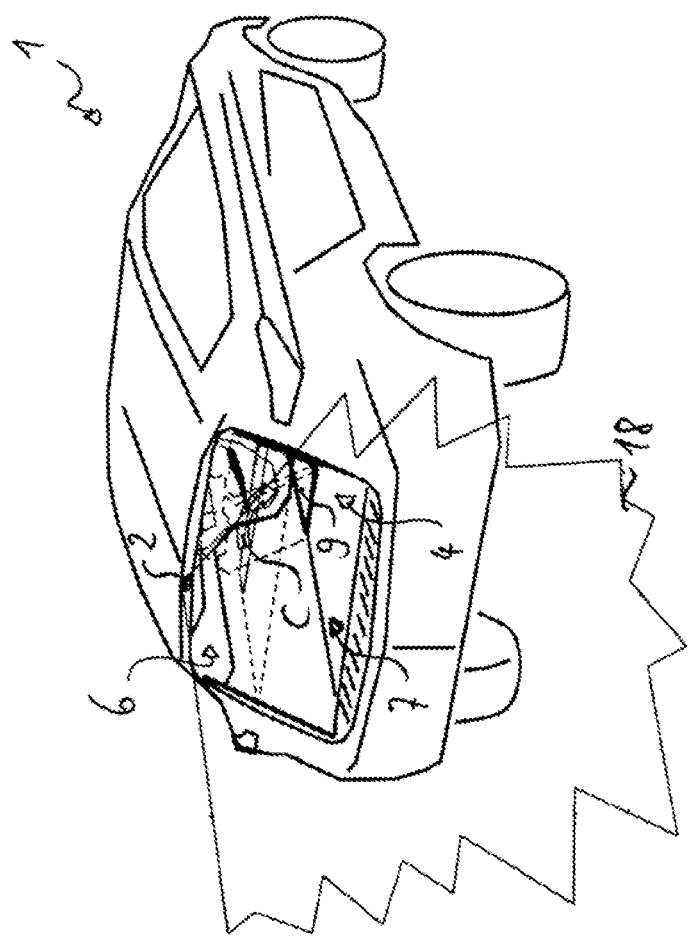

FIG. 4A to FIG. 4C shows the sequence of a method for situationally adjusting the vehicle according to FIG. 2. Components having the identical functions as in the preceding figures are labeled with the same reference numbers, and will not be explained in greater detail below. For the sake of clarity, the person and object are not shown again on FIGS. 4B and 4C. After the approach of the object 3 toward the vehicle 1 has been detected using the data acquired by the sensor 2, a tailgate 11 of the vehicle 1 opens automatically, as schematically depicted on FIG. 4A by arrow A. After the tailgate 11 has been automatically opened, a trunk cover 8 of the vehicle 1 is automatically retracted, as schematically depicted on FIG. 4B by arrow B. In addition, a rear shelf, for example a hat rack, of the vehicle 1 can be automatically shifted.

In another step, the seats 9 and 10 are automatically folded over, as schematically depicted on FIG. 4C by arrow C. Therefore, the embodiment shown incorporates a camera-based sensor system, which can detect an impending loading situation for the vehicle 1, and prepare the interior 4 for this loading situation. To this end, a rear camera in the form of the sensor 2 is coupled with an access control system of the vehicle 1, and situation recognition system with object recognition along with external and internal systems make it possible to automatically configure at least a partial area of the interior 4. The tailgate 11, trunk cover 8 and seats 9 and 10 are electrically activatable for this purpose in the embodiment shown. As a consequence, the depicted embodiment permits an enhanced level of comfort for users of the vehicle, a sophisticated functionality and greater flexibility in use.

Even though at least one exemplary embodiment was shown in the preceding description, various changes and modifications can be introduced. The mentioned embodiments only represent examples, and are not intended to in any way limit the scope of validity, applicability or configuration. Rather, the preceding description provides the expert with a plan for implementing at least one exemplary embodiment, wherein numerous changes can be made to the function and arrangement of elements described in an exemplary embodiment without departing from the scope of protection for the attached claims and their legal equivalents.

What is claimed is:

1. A method for situationally adjusting an interior cargo area of a vehicle, comprising:
   acquiring data for a partial area of an environment external to the interior cargo area of the vehicle with a sensor when the vehicle is stationary;
   determining when an object is approaching the interior cargo area of the vehicle using the data acquired from the sensor;
   determining at least one dimension of the approaching object toward the cargo area of the vehicle using the data acquired by the sensor; and
   adjusting the interior cargo area of the interior of the vehicle to the at least one dimension of the object in order to prepare the interior cargo area of the vehicle for receiving the object therein.

2. The method according to claim 1, further comprising receiving access authorization data for the vehicle with a receiving device of the vehicle, and
   wherein the partial area of the environment of the vehicle is acquired with the sensor after the receiving the access authorization data.

3. The method according to claim 2, wherein the receiving device is an ignition key of the vehicle.

4. The method according to claim 1, wherein the sensor is located in a rear area of the vehicle and configured to acquire the rear area of the environment of the vehicle while a tailgate of the vehicle is closed.

5. The method according to claim 1, wherein the sensor is an optical camera.

6. The method according to claim 1, wherein determining a configuration of the partial area of the interior of the vehicle is performed before the adjusting of the partial area of the interior of the vehicle.

7. The method according to claim 1, wherein the adjusting of the partial area of the interior of the vehicle is conducted with an actuator.

8. The method according to claim 1, wherein the vehicle is a motor vehicle.

9. The method according to claim 8, wherein the adjusting of the partial area of the interior comprises adjusting a configuration of a trunk of the motor vehicle.

10. The method according to claim 8, wherein the adjusting of the partial area of the interior comprises sliding a rear shelf of the motor vehicle.

11. The method according to claim 8, wherein the adjusting of the partial area of the interior comprises folding over a seat in the motor vehicle.

12. A vehicle having an interior cargo area, comprising:
    a sensor configured to generate data acquired from a partial area external to an environment of the interior cargo area of the vehicle when the vehicle is stationary;
    a first determination device configured to detect an approach of an object toward the interior cargo area of the vehicle using the data acquired by the sensor;
    a second determination device configured to ascertain at least one dimension of the object in response to the approach of the object toward the interior cargo area using the data acquired by the sensor; and
    an adjustment device configured to adjust the partial area of the interior cargo area of the vehicle to the at least one dimension of the object in order to prepare the interior cargo area for receiving the object therein.

13. The vehicle according to claim 12, further comprising a receiving device configured to receive access authorization data for the vehicle, and
    wherein the partial area of the environment of the vehicle is acquired with the sensor after the receiving device receives the access authorization data.

14. The vehicle according to claim 13, wherein the receiving device is an ignition key of the vehicle.

15. The vehicle according to claim 12, wherein the sensor is located in a rear area of the vehicle and configured to acquire the rear area of the environment of the vehicle.

16. The vehicle according to claim 12, wherein the sensor is an optical camera.

17. A computer readable medium embodying a computer program product, said computer program product comprising:
    a program for situationally adjusting an interior cargo area of a vehicle, the program configured to;
    acquiring data for a partial area external to an environment of the interior cargo area of the vehicle with a sensor when the vehicle is stationary;
    determining an approach of an object toward the interior cargo area of the vehicle in response to the approach of the object toward the interior cargo area using the data acquired from the sensor;
    determining at least one dimension of the object using the data acquired by the sensor; and adjusting the partial area of the interior cargo area of the vehicle to the at least one dimension of the object to prepare the interior cargo area for receiving the object therein.

18. The computer readable medium embodying the computer program product according to claim 17, wherein the program is configured to determine a configuration of the partial area of the interior of the vehicle before the adjusting of the partial area of the interior of the vehicle.

19. The computer readable medium embodying the computer program product according to claim 17, wherein the program is configured to control an actuator to adjust the partial area of the interior of the vehicle.

20. The computer readable medium embodying the computer program product according to claim 17, wherein the vehicle is a motor vehicle.

\* \* \* \* \*